United States Patent [19]
Komatsu et al.

[11] Patent Number: 6,126,331
[45] Date of Patent: Oct. 3, 2000

[54] DETERMINING A COMMUNICATION SCHEDULE BETWEEN PROCESSORS

[75] Inventors: Hideaki Komatsu, Yokohama; Takeshi Ogasawara, Hachioji, both of Japan

[73] Assignee: International Business Machines Corporation, Armonk, N.Y.

[21] Appl. No.: 08/869,902

[22] Filed: Jun. 5, 1997

[30] Foreign Application Priority Data

Jun. 5, 1996 [JP] Japan ................................. 8-142440

[51] Int. Cl.[7] .............................................. G06F 9/45
[52] U.S. Cl. ........................................ 395/706; 395/709
[58] Field of Search .............................. 395/200.68, 706, 395/672, 800.13; 711/149; 712/22

[56] References Cited

U.S. PATENT DOCUMENTS

| | | | |
|---|---|---|---|
| 4,387,427 | 6/1983 | Cox et al. ................................. | 395/672 |
| 4,972,314 | 11/1990 | Getzinger et al. ....................... | 711/149 |
| 5,247,694 | 9/1993 | Dahl ...................................... | 395/800.13 |
| 5,737,623 | 4/1998 | Liebrock ............................... | 395/800.13 |
| 5,742,821 | 4/1998 | Prasanna ................................ | 395/672 |

OTHER PUBLICATIONS

Al–Mouhamed, Lower Bound on the Number of Processors and Time for Scheduling Precedence Graphs with Communication Costs, IEEE Transactions on Software Engineering, vol. 16, No. 12, Dec. 1990.

Games–Kanevsky–Krupp–Monk, Real–Time Communications Scheduling for Massively Parallel Processors, IEEE, Dec. 1995.

*Primary Examiner*—Tariq R. Hafiz
*Assistant Examiner*—Antony Nguyen-Ba
*Attorney, Agent, or Firm*—Floyd A. Gonzalez

[57] ABSTRACT

To generate an optimum communication schedule when data is transmitted or received between processors which constitute a parallel computer or a distributed multiprocessor system.

Processors which each perform inter-processor communication are sorted into a plurality of groups. A communication graph is generated whose nodes correspond to the groups and edges correspond to the communications. Communication graphs are generated for distances between nodes from one through N–1. Each communication graph corresponds to a communication step of the inter-processor communication. Communication is grasped as a whole by the communication graph and the edge of the communication graph means the inter-processor communication which is performed in a certain communication step. In this way, the communication can be optimized.

8 Claims, 12 Drawing Sheets

```
      REAL A(1000,1000), B(1000,1000) C(1000,1000) T(1000,1000)
*HPF$ PROCESSORS P(sqrt(number_of_procs),sqrt(number_of_procs))
*HPF$ TEMPLATE T(i,j):: A(i,j), B(i,j), C(i,j)
*HPF$ DISTRIBUTE T(BLOCK,BLOCK) onto P DO i=1,1000
        DO J=1,1000
          DO K=1,1000
            A(i,j) = A(i,J) + B(i,K) + C(K,J)
          END DO
        END DO
      END DO
```

BROADCAST COMMUNICATION

SCATTER COMMUNICATION

GATHER COMMUNICATION

DETERMINING A COMMUNICATION SCHEDULE BETWEEN PROCESSORS

FIELD OF THE INVENTION

The present invention relates to a method of generating a communication schedule for transmitting and receiving data between processors constituting a parallel computer or a distributed multiprocessor system. In particular, the invention, in addition to being realized as one of the functions that a parallel compiler itself has, can also be employed in a communication library which is called out when an object program compiled by a parallel compiler is executed.

BACKGROUND ART

An important component for enhancing the performance of a parallel computer or a distributed multiprocessor system is the communication procedure in which communication is performed when transmitting and receiving data between processors. The communication speed between processors is considerably slower compared with the operating speed of a processor. Therefore, if communication is inefficiently performed, an enhancement in the system performance cannot be expected.

Thus, the conventional method performs inter-processor communication by using a relatively simple communication pattern of an asynchronous communication library. For this reason, there is the possibility that the communication waiting state will frequently occur. Consequently, there are cases where a parallel computer which communicates data by a method such as this cannot exhibit sufficiently high performance.

Accordingly, it is an objective of the present invention to generate an optimum communication schedule in the communication between processors constituting a parallel computer or a distributed multiprocessor system.

Another objective of the present invention is to prevent a reduction in the efficiency of a system by preventing a reduction in the efficiency of a memory or a virtual memory system.

SUMMARY OF THE INVENTION

To achieve the aforementioned objectives, a first aspect of the invention provides a method of determining a communication schedule in the case where data communication is performed between a plurality of processors of a system. The method comprises the steps of (1) sorting processors, which transmit and receive data through the inter-processor communications, into a plurality of groups, (2) generating communication graphs each of which has nodes respectively corresponding to said groups and edges respectively corresponding to said inter-processor communications, for distances of said nodes, and (3) determining said communication schedule of said inter-processor communications so that the generated communication graphs correspond to communication steps of the inter-processor communication.

A second aspect of the invention provides a method of determining a communication schedule in the case where data communication is performed between a plurality of processors of a system. The method comprises the steps of (1) sorting processors, which transmit and receive data through the inter-processor communications, into N groups, (2) generating N−1 communication graphs each of which has N nodes respectively corresponding to said groups and edges respectively corresponding to said inter-processor communications, for distances 1 through N−1 of said nodes, and (3) determining said communication schedule of said inter-processor communications so that the generated N−1 communication graphs correspond to communication steps of the inter-processor communication.

A third aspect of the invention provides a recording medium whereupon there is recorded a computer program for determining a communication schedule in the case where data communication is performed between a plurality of processors of a system. The recording medium comprises (1) first instruction means for sorting processors, which transmit and receive data through the inter-processor communications, into a plurality of groups, (2) second instruction means for generating communication graphs each of which has nodes respectively corresponding to said groups and edges respectively corresponding to said inter-processor communications, for distances of said nodes, and (3) third instruction means for determining said communication schedule of said inter-processor communications so that the generated communication graphs correspond to communication steps of the inter-processor communication.

A forth aspect of the invention provides a recording medium whereupon there is recorded a computer program for determining a communication schedule in the case where data communication is performed between a plurality of processors of a system. The recording medium comprises (1) first instruction means for sorting processors, which transmit and receive data through the inter-processor communications, into N groups, (2) second instruction means for generating N−1 communication graphs each of which has N nodes respectively corresponding to said groups and edges respectively corresponding to said inter-processor communications, for distances 1 through N−1 of said nodes, and (3) third instruction means for determining said communication schedule of said inter-processor communications so that the generated N−1 communication graphs correspond to communication steps of the inter-processor communication.

A fifth aspect of the invention provides a system which has a plurality of processor modules each comprising a processor, memory means, and communication means and where said communication means is able to input and output data at the same time. The system includes a parallel compiler which, when compiling a source program, executes an object program which includes a communication schedule for processors generated by executing the aforementioned methods.

Finally, a sixth aspect of the invention provides a system which has a plurality of processor modules each comprising a processor, memory means, and communication means and where said communication means is able to input and output data at the same time. The system includes a parallel compiler which, when compiling a source program to an object program, relates a parallel processing program region of said source program to a run time library which executes the aforementioned methods. The object program is executed based on a communication schedule for processors determined by executing said run time library when said object program is executed.

In accordance with the aforementioned aspects, a communication graph representing the communication relation between processors is generated wherein the communication which is executed may be grasped as a whole. Each pair of nodes that communicate are linked by an edge. Each edge of a communication graph is a communication between processors which is performed in a certain communication step. Those edges of a communication graph have the same distance. Therefor, when one communication related to a certain processor is executed in a certain communication step, the processor can be prevented from being occupied in another communication. In this way, occurrences of the waiting state of the processor can be reduced.

Particularly when communication graphs are generated for the distances 1 through N−1 of N nodes, these graphs are equivalent to complete communication graphs of N nodes. The optimum communication schedule of the complete communication graph whose communication amount is the same can be considered to be the coloring problem of a complete graph, and N−1 colors, that is, N−1 communication steps are optimum. By using this concept, optimum communication steps are generated.

DESCRIPTION OF THE PREFERRED EMBODIMENT

Figure 1:
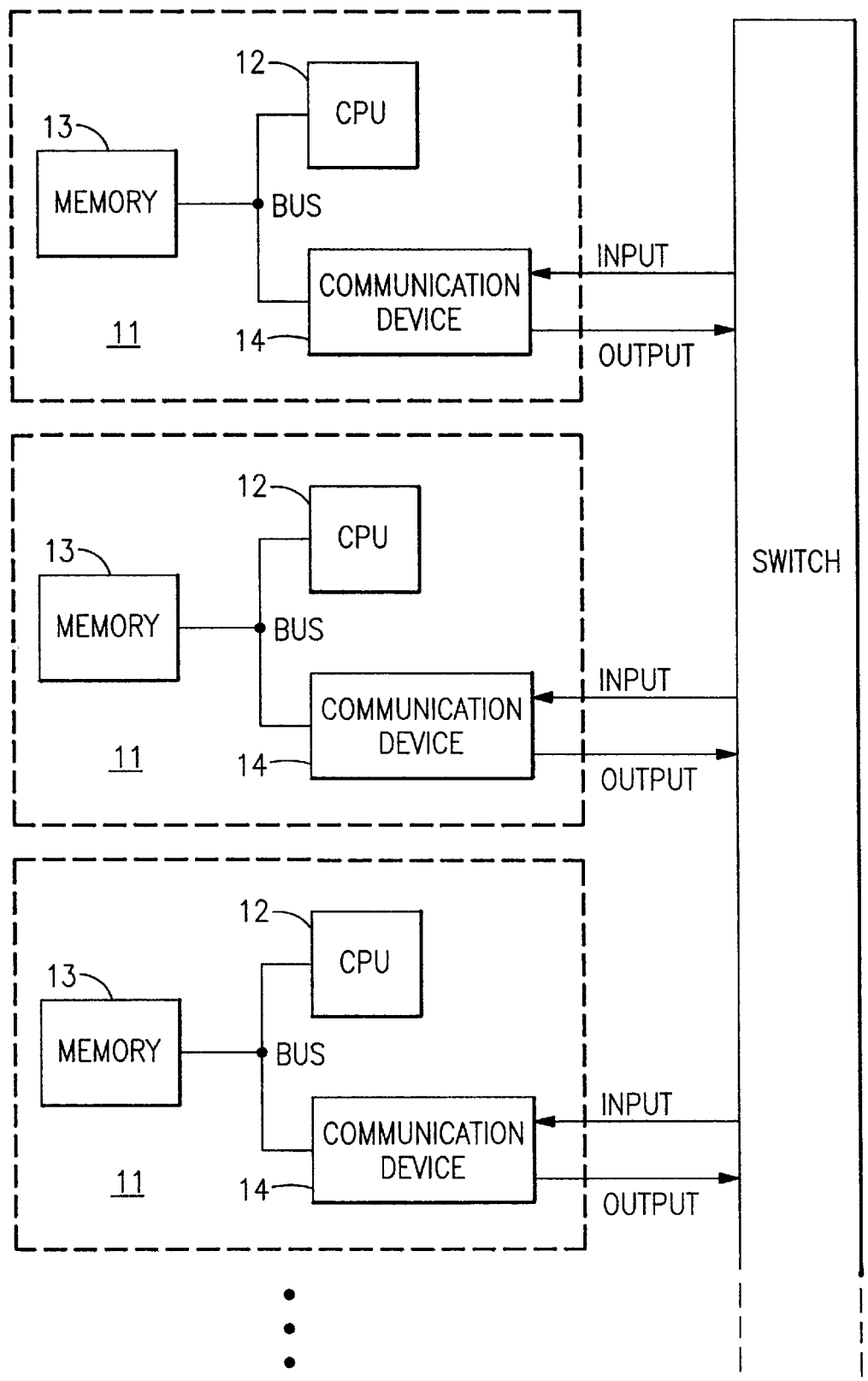
FIG. 1 is a block diagram of a system with a plurality of processors.

FIG. 1 is a diagram showing the concrete structure of a system such as this. A plurality of processor modules 11 are connected to buses. Each processor module 11 has a CPU 12, a memory 13, and a communication device 14. The communication device 14 has an input-only buffer and an output-only buffer. This device 14 is able to perform input and output in parallel. Generally, a local bus which connects the CPU 12 and the communication device 14 together has not been duplexed but has a wide transmission band to the extent that communication delay will not arise even when it is used in a time-division manner.

The aforementioned system is able to execute a plurality of one-to-one communications at the same time. The one-to-one communication means that the communication which a single processor can perform at the same time is only a single transmission or a single reception, or only a single transmission-reception. Thus, the communication method in which a single processor can perform both transmission and reception at the same time is called full-duplex communication and employed in high-performance switches (HPSs), etc.

In general parallel computers, the communication between a plurality of processors, which occurs when a program is executed, is executed based on an asynchronous communication library. For example, a communication library such as MPI and EUI has a relatively simpler communication pattern being frequently used, in addition to normal instructions such as a send instruction and a receive instruction.

Figure 17A:
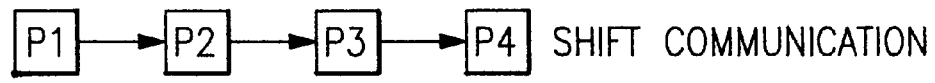
FIGS. 17(a), 17(b), 17(c) and 17(d) are diagrams showing the communication forms of simple communication patterns of a conventional communication library.
Figure 17B:
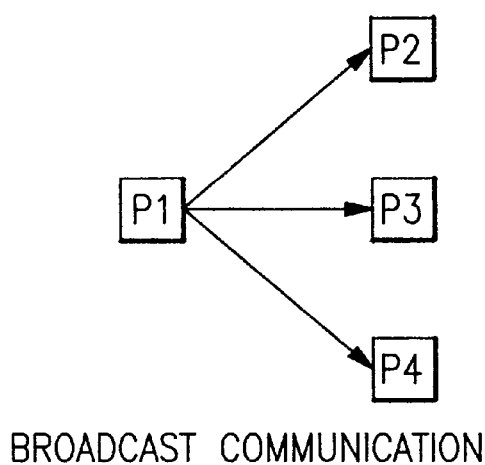
Figure 17C:
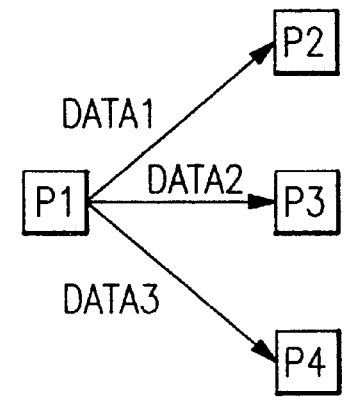
Figure 17D:
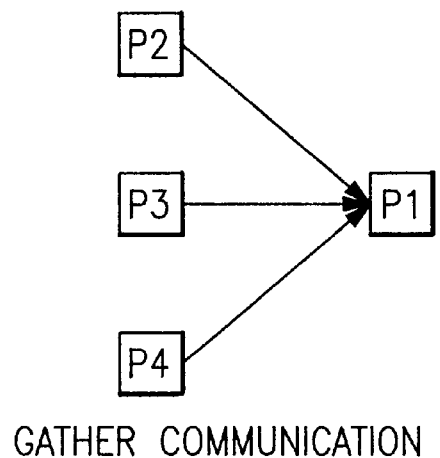

The aforementioned communication pattern is sorted into shift communication, broadcast communication, scatter communication, and gather communication. The shift communication, as shown in FIG. 17(a), is the communication from where each processor transmits data to the next processor in one direction. The broadcast communication, as shown in FIG. 17(b), is the communication form where data belonging to a single processor is transmitted to the all remaining processors. The scatter communication is a variation of the broadcast communication, and as shown in FIG. 17(c), one processor transmits different data to different processors, respectively. Finally, the gather communication, as shown in FIG. 17(d), is the communication form where data of all processors are gathered in a single processor.

When inter-processor communication is performed with the aforementioned communication patterns, all communications which are received based on the communication patterns by a certain processor are executed asynchronously. Then, until all communications which are executed by a communication library are completed, the processor is caused to be in a waiting state.

Thus, by asynchronously executing data communication, a certain processor can reliably receive or transmit all data. This communication system, however, is an asynchronous system based on communication patterns and not a system which is performed after grasping the entire communication to be executed. Therefore, in complicated communication there are cases where efficient communication is difficult to execute. This is because transmission is caused to be in a waiting state when a receiver receives data from another processor and thus the number of the entire communication steps (time) in increased.

In addition, because very large quantities of data are sent to a communication library at a time, the data has to be copied into the library. This reduces the efficiency of a cache storage or a virtual memory system. As a result, there is the possibility that system efficiency will be reduced considerably.

Figures 2, 4:
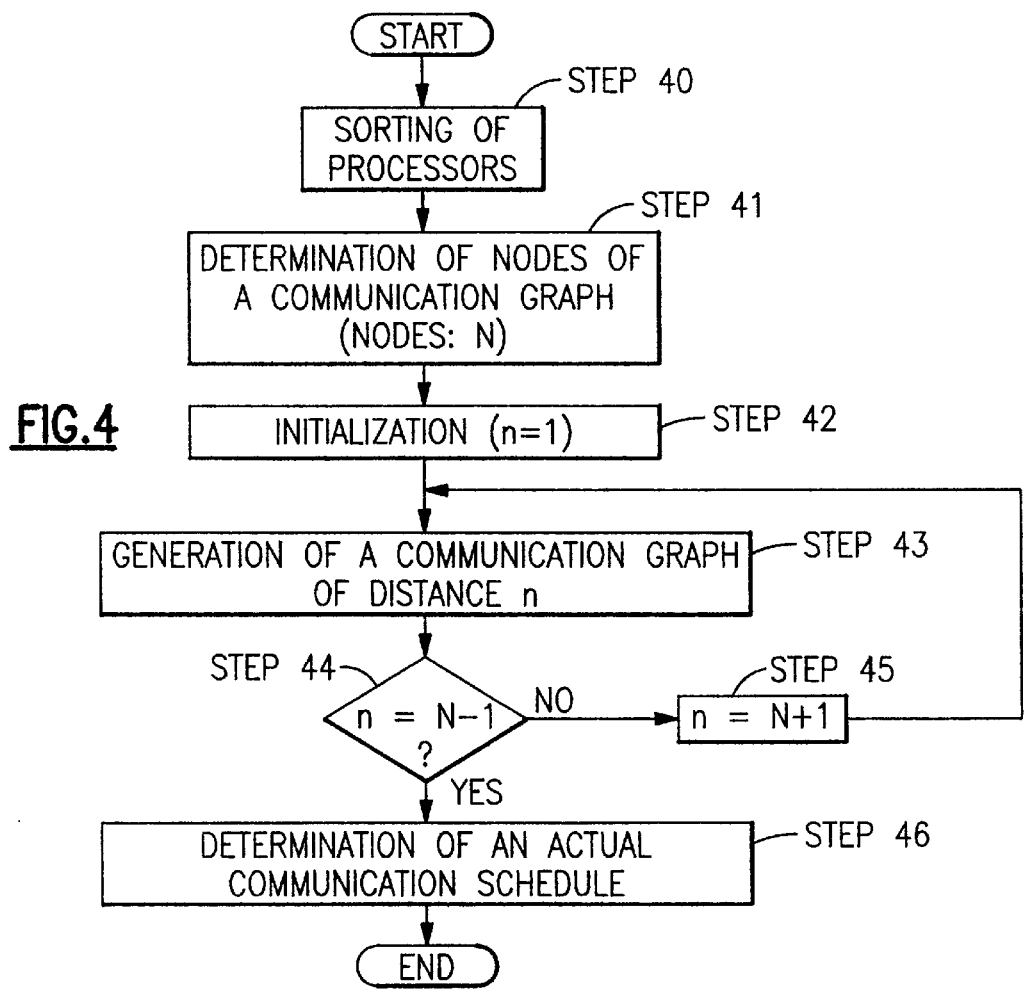
FIG. 2 is a diagram showing a program list for an operation of an array.
FIG. 4 is a flowchart showing the operation of an embodiment of the present invention.

FIG. 2 is a diagram showing a program list for obtaining the solution of a determinant. A program such as this is processed as an object of parallel processing by a HPF (high-performance FORTRAN) compiler and frequently appears in a source program.

Figure 3:
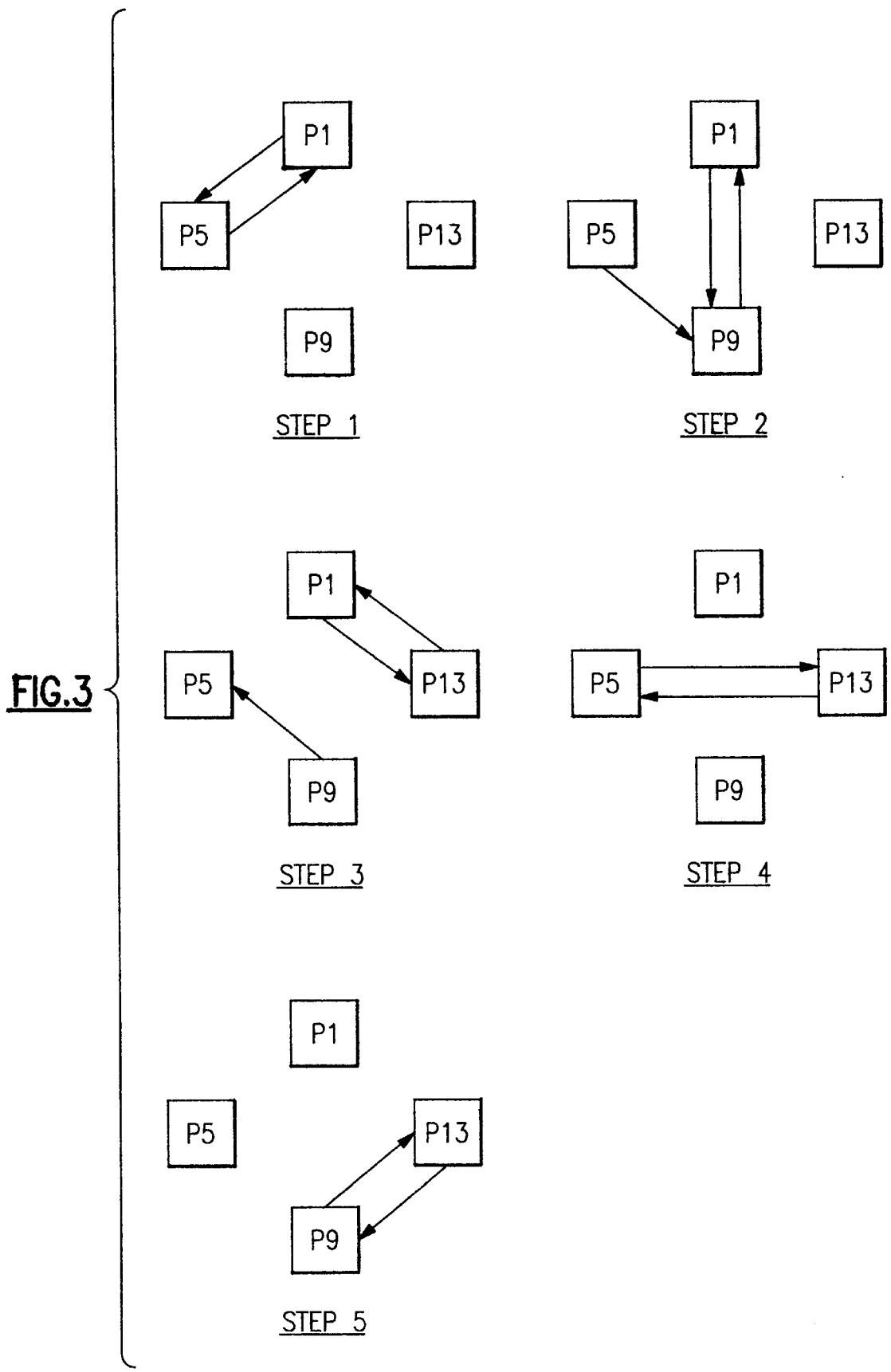
FIG. 3 is a diagram showing an inter-processor communication schedule using a conventional method.

When a parallel processing program is executed by a parallel computer, an example of the inter-processor communication based on an asynchronous communication library is communication steps such as those shown in FIG. 3. As a result of the determination based on a simple communication pattern, 5 communication steps are required and thus it cannot be said that communication is being performed according to optimally scheduled procedure.

FIG. 1 is a block diagram of a system with a plurality of processors. A plurality of processor modules 11 are connected to buses. Each processor module 11 has a CPU 12, a memory 13, and a communication device 14. The communication device 14 has an input-only buffer and an output-only buffer. This device 14 is able to perform input and output in parallel. Generally, a local bus which connects the CPU 12 and the communication device 14 together is not duplexed but has a wide transmission band to the extent that communication delay will not arise even when it is used in a time-division manner.

In order for each processor module in the aforementioned system to efficiently execute calculations in parallel, a parallel compiler, for example, compiles a source program to an object program which can be processed in parallel. In this case communication needs to be executed between processors, but the communication scheduling between the processors is determined by the operational flow of algorithm shown in FIG. 4. The sequence of communications is generally executed by a communication library which is called out during execution, but the parallel compiler itself may determine the sequence. This point will be described later. A computer program with the algorithm of FIG. 4 has generally been stored in a recording medium such as floppy disk. With this recording medium, users are able to use the program.

Processor Sort (Step 40)

A plurality of processors, which constitute a parallel computer or a distributed multiprocessor system, are sorted into a group of processors which receive data (a receiving processor group) and a group of processors which transmit data (a transmitting processor group). In the case where a certain processor performs both data transmission and data reception, this processor is included in both the receiving processor group and the transmitting processor group. Therefore, when all processors perform both data transmission and data reception, the receiving processor group and the transmitting processor group are identical with each other.

Figure 5:
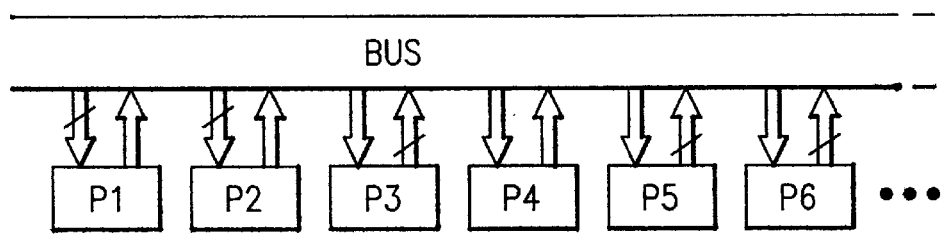
FIG. 5 is a schematic view showing the communication state which occurs between 6 processors.
Figure 6A:
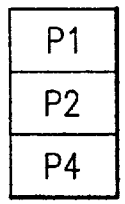
FIGS. 6(a), 6(b) and 6(c) are diagrams showing the transmitting and receiving processor groups and the virtual complete communication nodes in the example shown in FIG. 5.
Figure 6B:
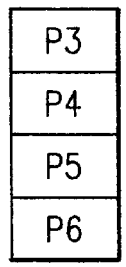

In the case where communication such as that shown in FIG. 5 is needed between six processors (P1 through P6) when a program is executed, the receiving processor group and the transmitting processor group become as shown in FIGS. 6(a) and 6(b).

Communication Graph's Node Determination (Step 41)

A single receiving processor is taken out from the receiving processor group and also a single transmitting processor is taken out from the transmitting processor group. This pair of a receiving processor and a transmitting processor is taken to be one node of a communication graph generated later. When the number of elements of one processor group is greater than that of another processor group and therefore there are processors of the former group that have no corresponding processors of the latter group, a single processor constitutes one node.

Figure 6C:
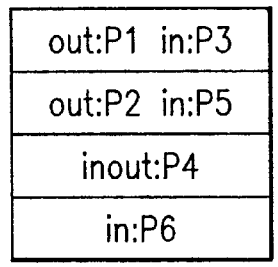

FIG. 6(c) shows an example of the nodes of a communicating graph determined from the groups of FIGS. 6(a) and 6(b). In this example, the elements in the tables of the transmitting and receiving processor groups are sorted in the ascending order, so the nodes of a complete communication graph can be generated by merging both tables while scanning them once. Therefore, an amount of calculation for generating nodes is reduced. That is, if P is taken to be the number of elements of the processor group whose number of elements is larger, an amount of calculation to generate nodes will be increased linearly with respect to P. This increase, however, is small in comparison with the amount of calculation, P log P, in the case where tables have not been sorted.

When the number of processors performing communication is large as compared with the entire number of processors, the bit wise expression where no sort is needed is effective. In the bit wise expression, a processor number corresponds to a bit number in a bit string and one bit expresses whether or not the processor is present. By using the bit wise expression, the bit searching time is one clock and therefore the amount of calculation for node determination is reduced. The amount of calculation is increased linearly with respect to the entire number of processors, however, in a 32-bit processor the operating speed is 32 times increased by using the bit wise expression. On the other hand, in the case where processor groups have already been sorted as in this example or in the case where the number of processors performing communication is small as compared with the entire number of processors, the merging of sorted lists is faster than the bit wise expression. Therefore, a method of generating nodes may be switched according to communication status.

Initialization (n=1) (Step 42)

A variable n, which prescribes the node-to-node distance of a communication graph generated in the following steps, is defined and the initial value is set to 1.

Generation of a Communication Graph of Distance n (Step 43)

Based on the nodes determined in step 41, a communication graph of node-to-node distance n is generated. Initially, a communication graph of distance 1 (n=1) is generated.

Based on the entry numbers of the nodes generated in step 41, the distance that the entry number has is caused to correspond to each communication step. For example, the edge of distance 1 is caused to correspond to the first communication step and the edge of distance 2 is caused to correspond to the second communication step. First, a certain processor transmits data to a receiving processor of an entry of distance 1 and received data from a transmitting processor of an entry of distance −1. Then, by causing a directed edge to correspond to the distance 1 in the direction from transmission to reception, a communication graph of distance 1 is made.

Figure 7A:
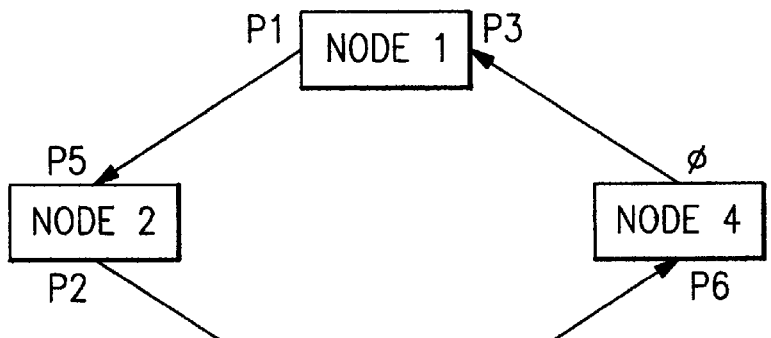
FIGS. 7(a), 7(b) and 7(c) are diagrams showing a complete communication graph generated based on FIGS. 6(a), 6(b) and 6(c)

If a communication graph of node-to-node distance 1 is generated based on the node table of the communication graph shown in FIG. 6(c), it will become as shown in FIG. 7(a). In this figure, a directed edge is present in the direction from node 4 to node 1, although a processor belonging to node 4 is only a receiving processor P6. In this case a virtual output processor φ is handled as being present in node 4. Because an actual communication step is finally determined in step 46 described later, a virtual processor which does not actually exist is taken to be a processor φ here.

Judgment of Whether n=N−1 (Step 44)

If the value of the variable n is not N−1, 1 is added to the variable n in step 45 and the process is returned to step 43. Here, N represents the number of nodes of the communication graph. If the variable n is N−1, step 46 is executed.

Step 43 through 45 are iterated. Each iteration generates a communication graph of distance n. This generates a complete graph where the number of nodes is N. In this embodiment the complete graph is used for generating a communication schedule. In the coloring problem of a complete graph, the chromatic number is an optimum solution, so it is found that N−1 communication steps are most efficient.

n=n+1 (Step 45)

Figure 7B:
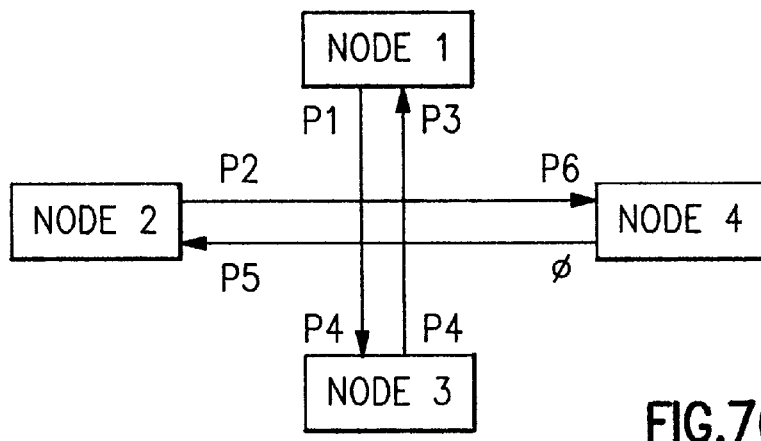
Figure 7C:
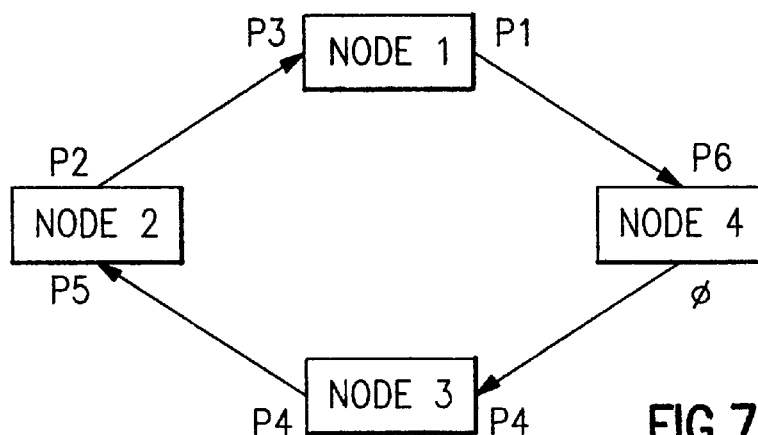

In this step, 1 is added to n. When n=2, transmission to a receiving processor of an entry of distance 2 and reception from a transmitting processor of an entry of distance −2 are performed at the same time, as in the case of distance 1. In this way, the aforementioned steps are executed for distance 3 through distance N−1. FIGS. 7(b) and 7(c) show communication graphs of distance 2 and distance 3, respectively. All communication graphs of FIGS. 7(a), 7(b), and 7(c) constitute a complete communication graph.

Determination of an Actual Communication Schedule (Step 46)

The communication graphs at the respective distances generated in the aforementioned steps are virtual. That is, the complete communication graph includes a processor (φ) which does not actually exist and also includes different processors in the same node. Therefore, based on this virtual complete communication graph, there is the need to determine an actual communication schedule.

Initially, the directed edges including the processor φ are excluded from each of the aforementioned communication graphs. Edges of those communication graphs are actual communications. In this example, those communications are performed in three steps, and each i-the step executes communications of distance i.

Figure 8:
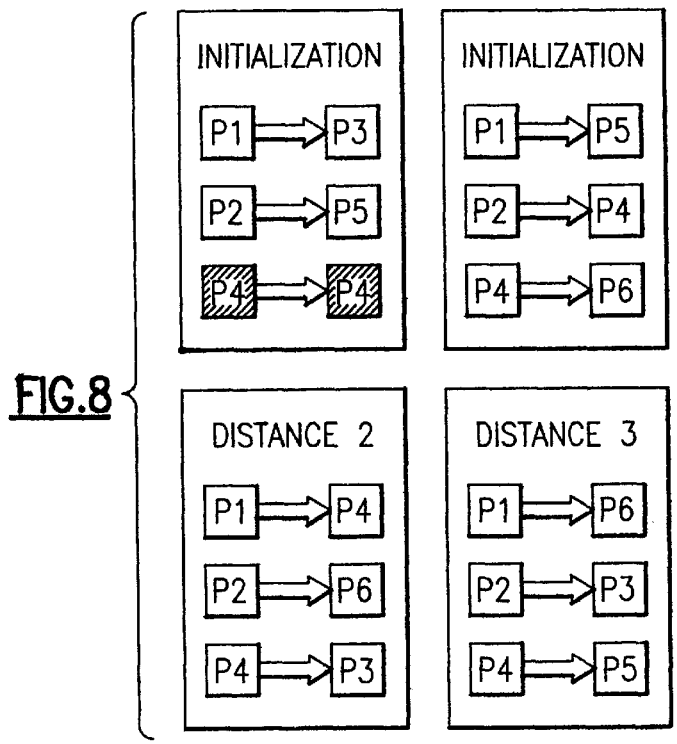
FIG. 8 is a diagram showing an actual communication schedule extracted from the complete communication graph of FIG. 7.

FIG. 8 is a diagram showing an actual communication schedule extracted from the complete communication graph of FIG. 7. In FIG. 8 the communications of distance 1, distance 2, and distance 3 correspond to the aforementioned steps, respectively. Furthermore, if there are communications in a node, those are called communications of distance 0, and are performed in the initialization step. In this example, communications of distance 0 are added, finally, four communication steps are required.

In FIG. 8 communication from P4 to P4 exists like a processor P4 shown by oblique lines in the initialization. This means that an occurrence of delay is prevented by performing local copy at this timing, if necessary. If local copy is not necessary, there will be no need to do anything here.

In the aforementioned embodiment, the communications graphs from the distance 1 between nodes to the distance N−1, that is, a complete communication graph is generated and, based on this, a communication schedule is determined. However, in the present invention, a complete communication graph does not always need to be generated and it is important that the communication graph of each distance between nodes corresponds to each communication step.

Figure 9A:
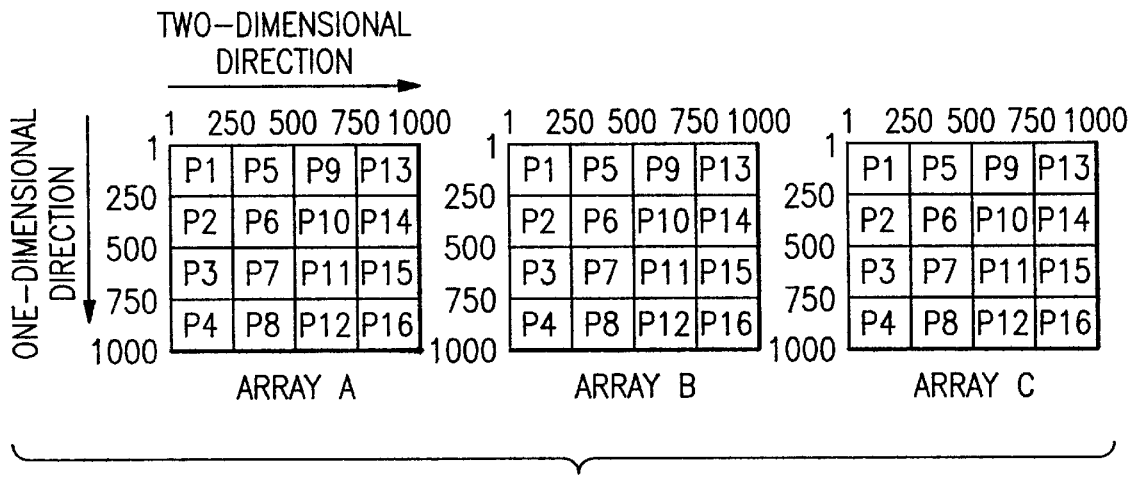
FIGS. 9(a) and 9(b) are diagrams showing segmentation of an array of data into blocks of data and processors where the blocks of data are stored.

The communication analysis in a program list of FIG. 2 is actually performed by using the aforementioned algorithm. Here, a description will be made of the case where each array data, described in this program list, is segmented into blocks of data and stored in 16 processors as shown in FIG. 9(a). That is, array data A(i, j) (where 1≦i≦1000 and 1≦j≦1000) is segmented into blocks of data in both dimensions of A and blocks are stored in processor array P(4, 4). For example, the block of data from an array A(251, 1) to an array A(500, 250) is stored in a processor P1 and the block of data from an array A(1, 1) to an array A(250, 250) is stored in a processor P2. In the same way, array data B(i, j) and array data C(i, j) are segmented into blocks of data and stored in processors, as shown in FIG. 9(a).

In many HPF (high performance FORTRAN) processing systems, the calculation of a certain assignment statement is performed by processors that have the array data on the left side of the assignment statement in their own local memory. Thus, the processors which perform calculation of a certain assignment statement are called owners. If the array data on the right side of the assignment statement is stored in the local memory of processors other than owners, there will arise the need to transmit the data to the owners.

Owners which calculate the assignment statement (a) in the program list of FIG. 2 are processors which have the left-side array data A(i, j). In the "DO" loop of i=1 and j=1, for example, the calculation of the assignment statement (a) is executed by processor p1 which has stored the array data A(1, 1) existing on the left side. In this case the right-side array data needed for the processor 1 to calculate the left-side array data A(1, 1) are A(1, 1), B(1, 1) through B(1, 1000), and C(1, 1) through C(1000, 1).

Regions to be communicated are calculated to complete the assignment by using the segmentation information of array data such as that shown in FIG. 9(a). The A(1, 1) on the right side has exactly the same index equation as the left side and is the data stored in the processor P1 which is the owner, so there is no need for communication.

Figure 9B:
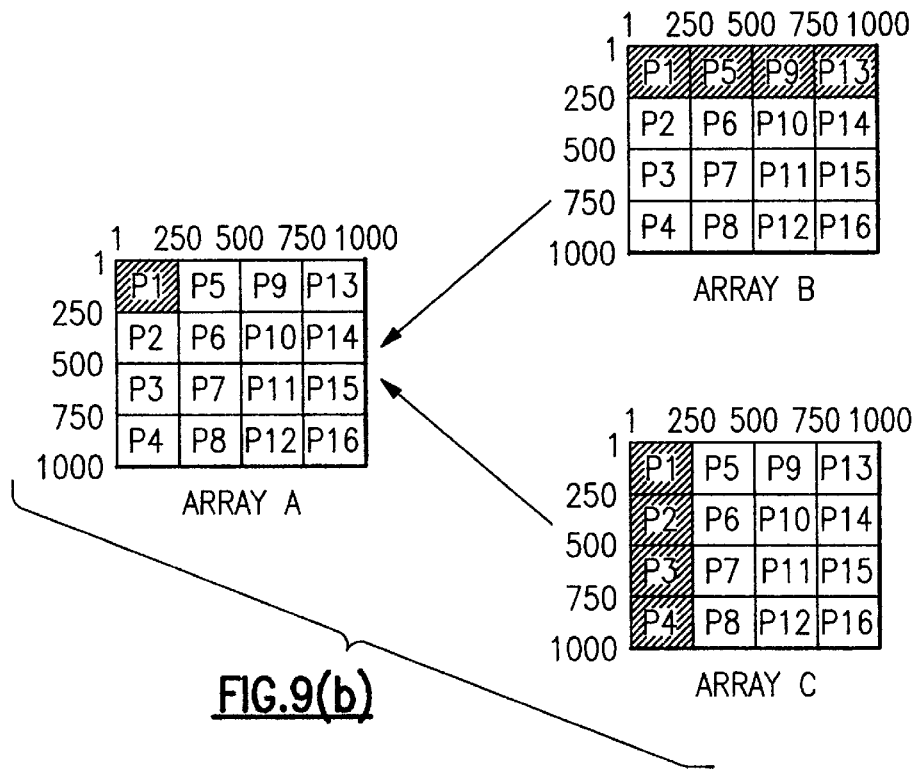

FIG. 9(b) is a diagram showing communications among processors which are necessary for calculating the array A on the left side of the assignment statement. In this figure, the processor P1 requires the oblique-line portion of the array B and the oblique-line portion of the array C when calculating the oblique-line portion of the array A, so communication takes place between processors where these blocks of data are stored.

As evident in FIG. 9(b), the block of data B(1, 1) through B(1, 250) stored in the processor P1 (owner), the block of data B(1, 251) through B(1, 500) stored in the processor P5, the block of data B(1, 501) through B(1, 750) stored in the processor P9, and the block of data B(1, 751) through B(1, 1000) stored in the processor P13 are necessary for calculating array data A(1, 1). Therefore, it is found that single complete communication is performed between the processors (P1, P5, P9, P13) where data is segmented into blocks in the second dimension.

Also, the block of data C(1, 1) through C(250, 1) stored in the processor P1 (owner), the block of data C(251, 1) through C(500, 1) stored in the processor P2, the block of data C(501, 1) through C(750, 1) stored in the processor P3, and the block of data C(751, 1) through C(1000, 1) stored in the processor P4 are necessary for calculating the array data. Therefore, it is found that single complete communication is performed between the processors (P1, P2, P3, P4) where data is segmented into blocks in the first dimension.

The receiving processor group and the transmitting processor group of the group (P1, P5, P9, P13) are as follows. (The same segment of the array B is transmitted to processors P5, P9, and P13 as well as P1.)

Equation 1
Receiving processor group: (P1, P5, P9, P13)
Transmitting processor group: (P1, P5, P9, P13)

Nodes of the complete communication graph are generated from the aforementioned groups as follows.
Equation 2
inout: P1 . . . Node P1
inout: P5 . . . Node P5
inout: P9 . . . Node P9
inout: P13 . . . Node P13

Since the number of nodes is 4 (N=4), complete communication graphs are generated for distances up to distance 3 (N−1=3), respectively. The result is shown in FIG. 10.

Figure 10:
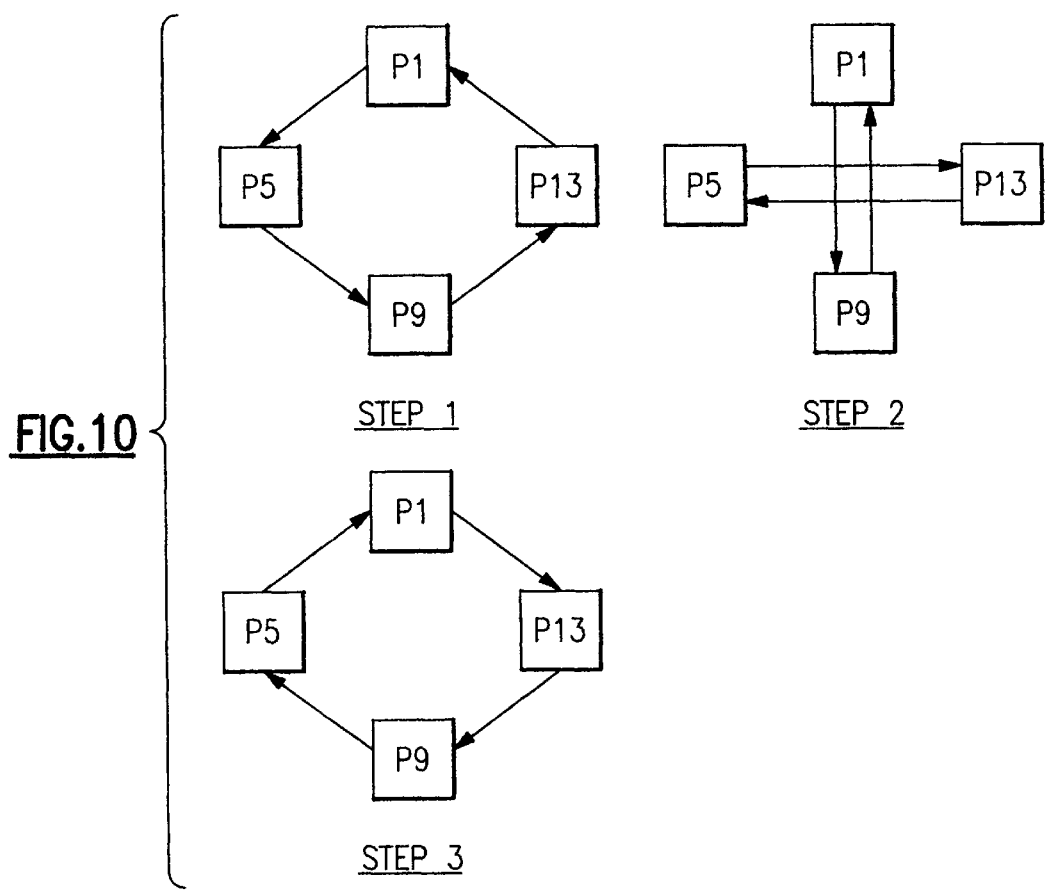
FIG. 10 is a diagram showing the complete communication graphs of the program list of FIG. 2.

In the example of FIG. 10 a different processor is not present in the same node, so the initialization is not needed. In addition, the virtual processor φ does not exist. Therefore, three complete communication graphs, as they are, become actual communication patterns. That is, communication is completed in three communication steps, which correspond to the communication graphs of distance 1, distance 2, and distance 3, respectively.

Although the aforementioned description has been made of array data A(1, 1), it is also exactly true for the calculation of array data A(1, 2) through A(250, 250).

Consider B(1, 1) through B(1000, 1000) of the array data B in accordance with the aforementioned procedure. By the aforementioned communication analysis, 4 complete communications are performed between processors grouped in the second dimension. More specifically, one complete communication is performed between processors P1, P5, P9, and P13. Likewise, the other 3 complete communications are performed between processors P2, P6, P10, and P14, between processors P3, P7, P11, and P14, and between processors P4, P8, P12, and P16, respectively.

The aforementioned 4 complete communications are performed in parallel and the communication needed for the array data B is completed. In this case the requisite communication steps are three steps, which correspond to distance 1, distance 2, and distance 3. Thus, the communication cost is 3. Notice that the cost of the communication using the aforementioned algorithm is reduced as compared with the cost of the communication using the conventional method shown in FIG. 3.

In the case of array data C, 4 complete communication groups are made in the first dimension. By executing the same procedures as the case of the array data B, communication can be completed in 3 communication steps.

While the aforementioned embodiment has been described with relation to the case where a communication device is fully duplexed, it is also applicable to half-duplex communication. In the case of half-duplex communication, each step is divided into two steps.

Furthermore, the algorithm, shown in the aforementioned embodiment, is applicable when data that is communicated before the execution of a parallelized loop is prefetched by message vectors. Moreover, the algorithm are applicable when data is redistributed or when distributed data bases are reconstructed.

Figure 11:
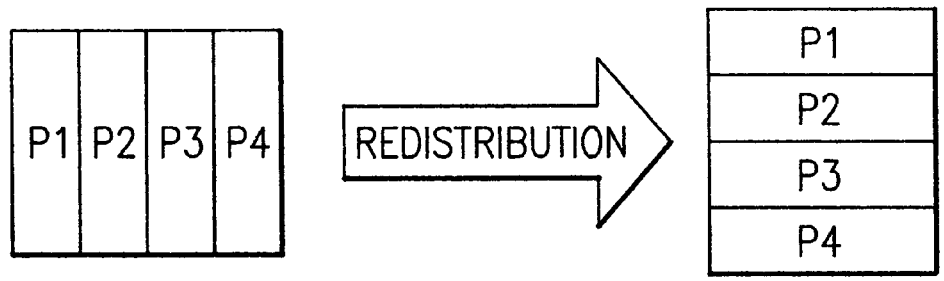
FIG. 11 is a state transition diagram in the case where data is redistributed between the entire processors.

FIG. 11 shows a data redistribution between the entire processors. Redistribution such as this arises in the case where one algorithm has parallelism in the first dimension of a two-dimensional array and the other algorithm has parallelism in the second dimension of the two-dimensional array, or in the case where a data segmenting method is changed from block segmentation to cyclic segmentation.

Figure 12:
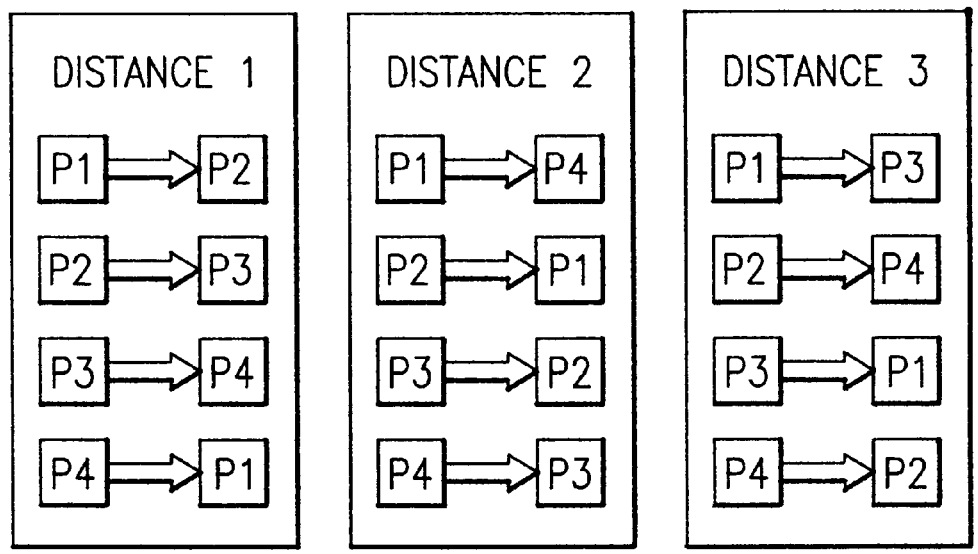
FIG. 12 is a diagram showing the actual communication steps of the data redistribution of FIG. 11.

In the case of the aforementioned redistribution, all processors attain a complete communication graph and, by using the aforementioned algorithm, an optimum communication schedule can be determined. In this case there is no necessity of initialization, so communication can be performed in the number of communication steps less than the number of processors by one. FIG. 12 shows the actual communication steps of the data redistribution of FIG. 11. The respective distances correspond to the respective communication steps, so the number of communication steps is 3.

Figure 13:
FIG. 13 is a state transition diagram in the case where data distribution is performed so that the number of processors is reduced.
Figure 14:
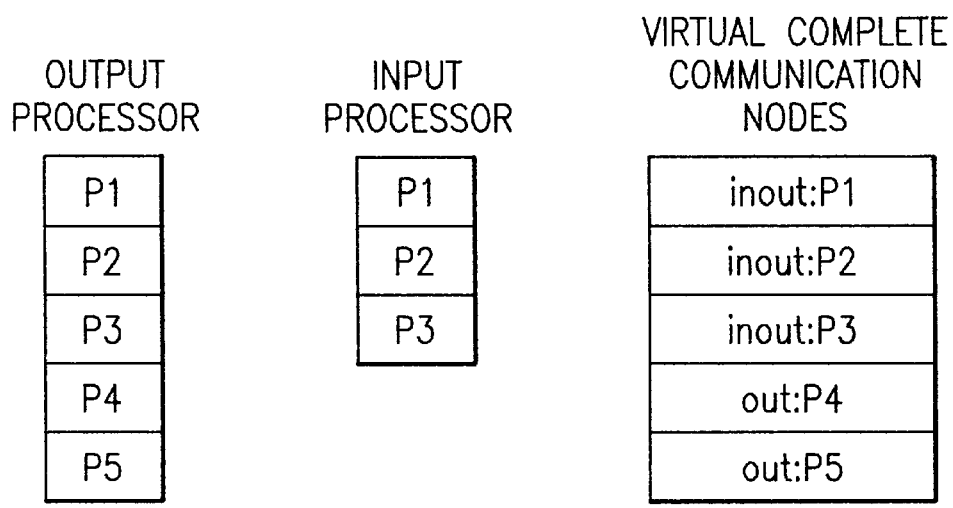
FIG. 14 is a diagram showing the transmitting processor group, the receiving processor group, and the nodes of the complete communication graph in the example of FIG. 13.
Figure 15:
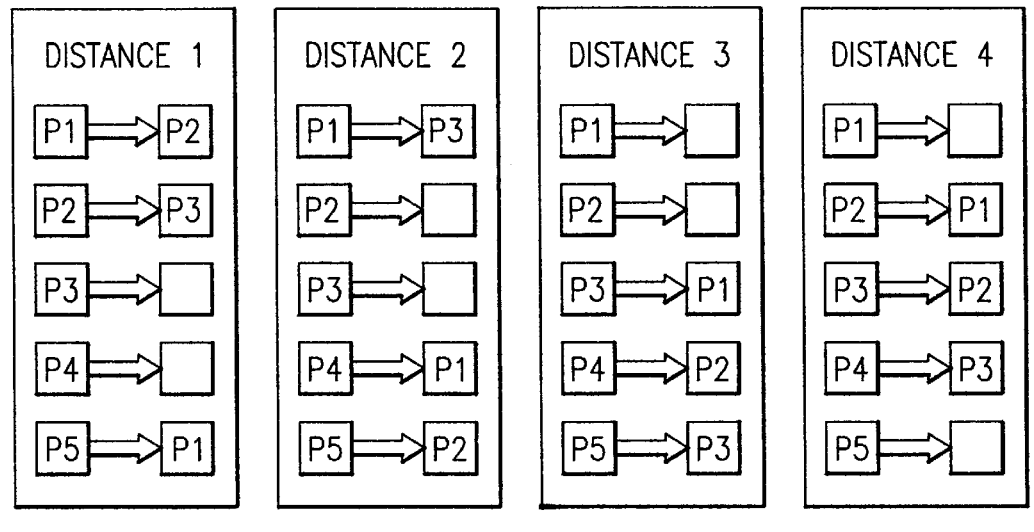
FIG. 15 is a diagram showing the complete communication graph in the example of FIG. 14.
Figure 16:
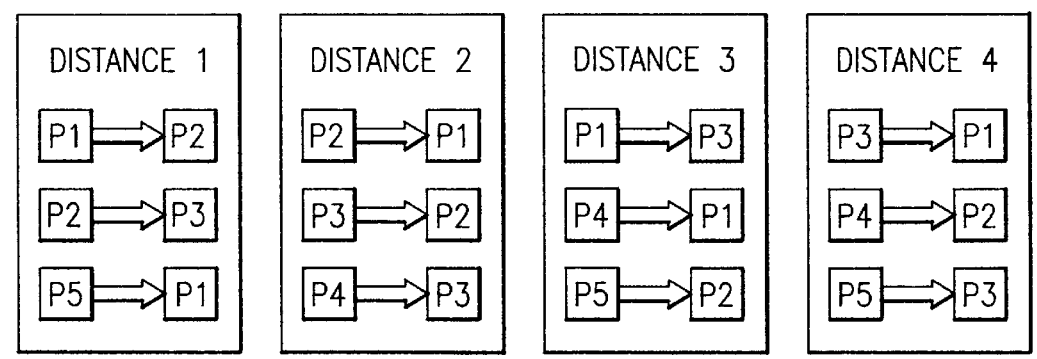
FIG. 16 is a diagram showing actual complete communication steps in the example of FIG. 15.

FIG. 13 shows a data redistribution where the number of processors is reduced. The transmitting processor group, the receiving processor group, and the nodes of the complete communication graph are shown in FIG. 14. The complete communication graphs in this example are shown in FIG. 15. From these complete communication graphs, an actual optimum communication schedule is obtained as shown in FIG. 16. As evident in this figure, communication can be performed in 4 communication steps.

A parallel compiler may have the aforementioned algorithm, or the algorithm can be used in one of the run time libraries as a communication schedule determining routine.

Figure 18:
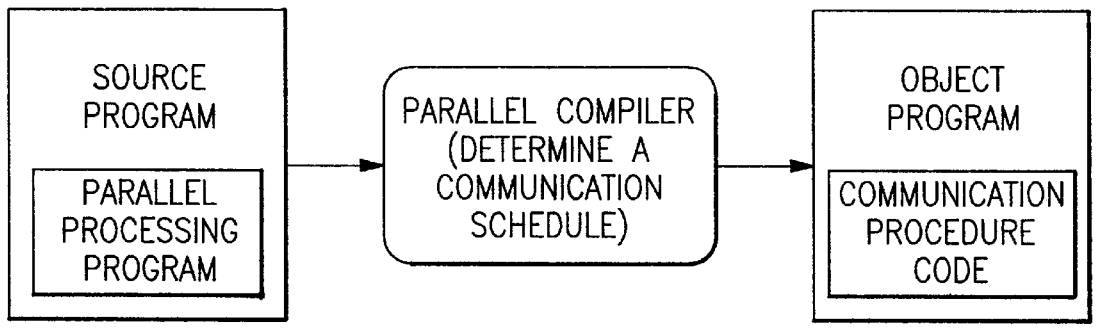
FIG. 18 is a diagram showing the state of an object program generated when a parallel compiler itself determines a communication schedule.

FIG. 18 is a diagram showing the case in which a parallel compiler itself has the aforementioned algorithm. The parallel compiler detects a parallel processor program, such as that shown in FIG. 2, from a source program and determines an inter-processor communication schedule when it is compiled in accordance with the aforementioned algorithm.

Figure 19:
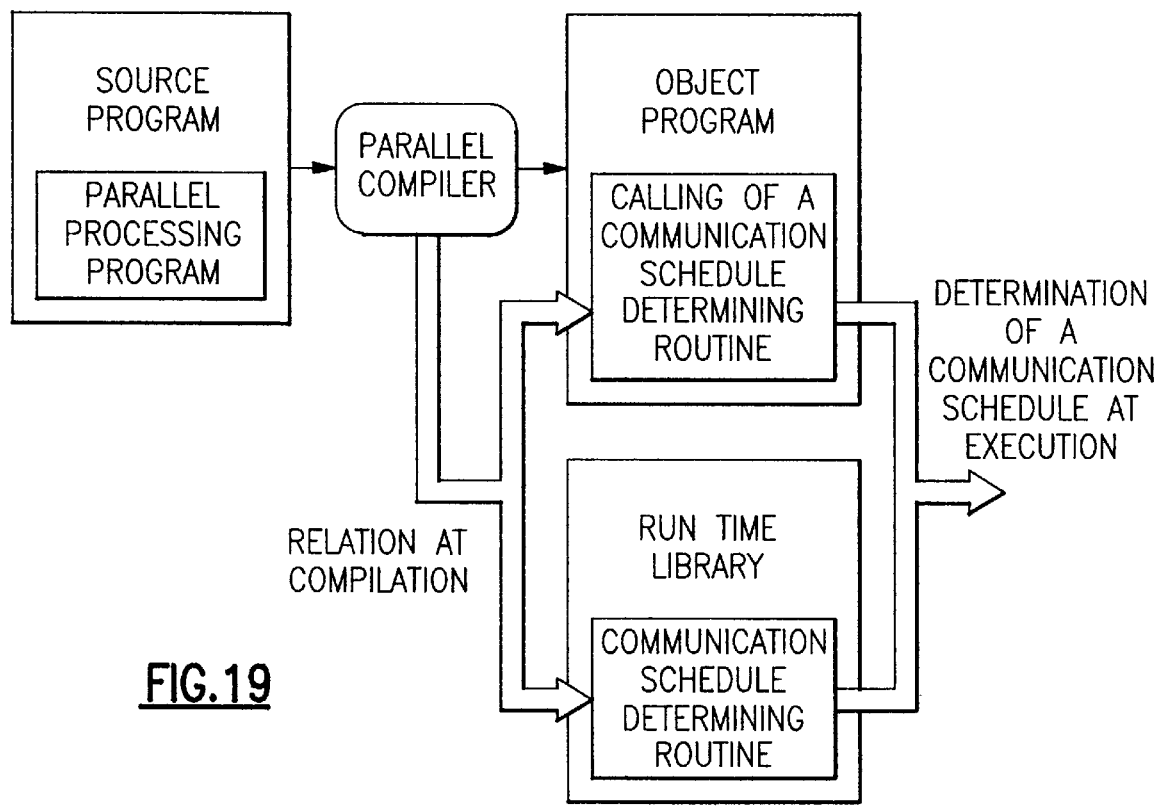
FIG. 19 is a diagram showing the state of an object program generated when a run time routine determines a communication schedule.

FIG. 19 is a diagram showing the case in which the aforementioned algorithm is employed as a communication schedule determining library routine. When the parallel compiler detects communications in the source program shown in FIG. 2, the compiler generates an object program where the program portion of the source program is related to a communication schedule determining routine. More specifically, when compiling, the parallel compiler only relates the program portion to a certain routine in the run time library and does not determine any concrete communication schedule. When a system executes the object program, the related routine is called out and an optimum communication schedule is determined when the routine is executed. The aforementioned algorithm does not require a large amount of calculation for determining the optimum communication schedule. Therefore, even if the calculation is performed at runtime, the inter-processor communication can be performed faster than the conventional method.

In many cases the aforementioned algorithm is used to schedule inter-process communication at runtime, however the overhead time to analyze this communication is very short and optimum communication can be performed without a substantial waiting time. A high-speed communication library can be implemented which uses the aforementioned algorithm.

Furthermore, the aforementioned algorithm is applied mainly to a network which can perform one-to-one transmission-reception at the same time, such as HPS. However, it is also applicable to a token ring or a LAN (in the entire system only a pair of processors that performs one-to-one transmission/reception is allowed).

Advantages of the Invention

In this way, the present invention schedules communications that occur in the multiprocessor system after those communications are grasped as a whole. When data is transmitted or received, occurrences of the waiting state can be reduced. Thus, effective communication among processors can be achieved. In particular, by employing complete communication graphs, generation of an optimum communication schedule is attained. The invention also improves the system performance by reducing an inefficient use of a memory or a virtual memory system.

What is claimed is:

1. A method of determining a communication schedule in the case where data communication is performed between a plurality of processors of a system, the method comprising the steps of:

sorting processors, which transmit and receive data through the interprocessor communications, into a plurality of groups;

generating communication graphs each of which has nodes respectively corresponding to said groups and edges respectively corresponding to said inter-processor communications, for distances of said nodes;

determining said communication schedule of said inter-processor communications so that the generated communication graphs correspond to communication steps of the inter-processor communication; and when the processors belonging to the same node are different, adding to said communication schedule, communication between said processors belonging to the same node.

2. The method as set forth in claim 1, wherein said sorting step forms each of said groups for each pair constituted by the processor which transmits data and the processor which receives data.

3. A method of determining a communication schedule in the case where data communication is performed between a plurality of processors of a system, the method comprising the steps of:

sorting processors, which transmit and receive data through the inter-processor communications, into N groups;

generating N−1 communication graphs each of which has N nodes respectively corresponding to said groups and edges respectively corresponding to said inter-processor communications, for distances 1 through N−1 of said nodes;

determining said communication schedule of said inter-processor communications so that the generated N−1 communication graphs correspond to communication steps of the inter-processor communication; and when the processors belonging to the same node are different, adding to said communication schedule, communication between said processors belonging to the same node.

4. The method as set forth in claim 3, wherein said sorting step forms each of said groups for each pair constituted by the processor which transmits data and the processor which receives data.

5. A recording medium where there is recorded a computer program of determining a communication schedule in the case where data communication is performed between a plurality of processors of a system, the recording medium comprising:

first instruction means for sorting processors, which transmit and receive data through the inter-processor communications, into a plurality of groups;

second instruction means for generating communication graphs each of which has nodes respectively corresponding to said groups and edges respectively corresponding to said inter-processor communications, for distances of said nodes;

third instruction means for determining said communication schedule of said inter-processor communications so that the generated communication graphs correspond to communication steps of the inter-processor communication; and fourth instruction means which, when the processors belonging to the same node are different, adds to said communication schedule, communication between said processors belonging to the same node.

6. The recording medium as set forth in claim 5, wherein said first instruction means forms each of said groups for each pair constituted by the processor which transmits data and the processor which receives data.

7. A recording medium where there is recorded a computer program of determining a communication schedule in the case where data communication is performed between a plurality of processors of a system, the recording medium comprising:

first instruction means for sorting processors, which transmit and receive data through the inter-processor communications, into N groups;

second instruction means for generating N−1 communication graphs each of which has N nodes respectively corresponding to said groups and edges respectively corresponding to said inter-processor communications, for distances 1 through N−1 of said nodes;

third instruction means for determining said communication schedule of said inter-processor communications so that the generated N−1 communication graphs correspond to communication steps of the inter-processor communication; and fourth instruction means which, when the processors belonging to the same node are different, adds to said communication schedule, communication between said processors belonging to the same node.

8. The recording medium as set forth in claim 7, wherein said first instruction means forms each of said groups for each pair constituted by the processor which transmits data and the processor which receives data.

* * * * *